(12) United States Patent
Schneider et al.

(10) Patent No.: US 8,672,347 B2
(45) Date of Patent: Mar. 18, 2014

(54) INTEGRATED AIRBAG RESTRAINT

(75) Inventors: David W. Schneider, Waterford, MI (US); Patrick Patercsak, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/441,974

(22) Filed: Apr. 9, 2012

(65) Prior Publication Data

US 2013/0264803 A1 Oct. 10, 2013

(51) Int. Cl.
*B60R 21/18* (2006.01)

(52) U.S. Cl.
USPC .................................. 280/733; 280/743.2

(58) Field of Classification Search
USPC ............. 280/733, 728.1, 730.1, 743.2, 801.1, 280/805; 180/268; 297/468, 470
See application file for complete search history.

(56) References Cited

U.S. PATENT DOCUMENTS

| | | | | |
|---|---|---|---|---|
| 3,975,037 | A * | 8/1976 | Hontschik et al. | 280/733 |
| 4,854,608 | A | 8/1989 | Barral | |
| 5,161,821 | A * | 11/1992 | Curtis | 280/730.2 |
| 5,465,999 | A * | 11/1995 | Tanaka et al. | 280/733 |
| 5,597,178 | A * | 1/1997 | Hardin, Jr. | 280/733 |
| 5,984,350 | A | 11/1999 | Hagan et al. | |
| 6,293,582 | B1 * | 9/2001 | Lewis | 280/735 |
| 6,505,854 | B1 | 1/2003 | Sands et al. | |
| 6,729,643 | B1 | 5/2004 | Bassick et al. | |
| D533,045 | S | 12/2006 | Schroth | |
| 7,665,761 | B1 * | 2/2010 | Green et al. | 280/733 |
| 7,980,590 | B2 * | 7/2011 | Foubert et al. | 280/733 |
| 8,439,398 | B2 * | 5/2013 | Baca | 280/733 |
| 2002/0011723 | A1 | 1/2002 | Lewis | |
| 2002/0067031 | A1 | 6/2002 | Busgen et al. | |
| 2005/0179244 | A1 | 8/2005 | Schroth | |
| 2007/0096535 | A1 | 5/2007 | Lundell et al. | |
| 2009/0066063 | A1 | 3/2009 | Mical | |
| 2011/0001312 | A1 | 1/2011 | Schubert et al. | |
| 2011/0204606 | A1 | 8/2011 | Rathmann-Ramlow et al. | |

FOREIGN PATENT DOCUMENTS

| | | |
|---|---|---|
| DE | 4301403 A1 | 7/1994 |
| DE | 10317314 B3 | 7/2004 |
| DE | 10314423 B3 | 9/2004 |
| DE | 102007048486 B3 | 10/2008 |
| DE | 102010013088 A1 | 8/2011 |
| EP | 1243485 A2 | 9/2002 |
| EP | 1290959 A2 | 3/2003 |
| EP | 2360066 A1 | 8/2011 |
| EP | 2360067 A2 | 8/2011 |
| FR | 2747631 A1 | 10/1997 |
| GB | 2406078 A | 3/2006 |
| WO | 9625062 A1 | 8/1996 |
| WO | 200523607 | 3/2005 |

OTHER PUBLICATIONS

International Search Report regarding Application No. PCT/US2013/033469 mailed Jun. 17, 2013.
Written Opinion of the International Searching Authority regarding Application No. PCT/US2013/033469 mailed Jun. 17, 2013.

* cited by examiner

*Primary Examiner* — Drew Brown
(74) *Attorney, Agent, or Firm* — Harness, Dickey & Pierce, P.L.C.

(57) ABSTRACT

A restraint system for a seat is provided and may include a first portion formed from a first material and having a first end fixed for movement with the seat and a second end movable relative to the seat. A second portion may be integral with or attached to the first portion, may be formed from the first material, and may be operable between a pre-deployed state and an inflated state.

29 Claims, 8 Drawing Sheets

INTEGRATED AIRBAG RESTRAINT

FIELD

The present disclosure relates to safety restraints and more particularly to a safety restraint including an integrated airbag.

BACKGROUND

This section provides background information related to the present disclosure which is not necessarily prior art.

Mobile platforms such as vehicles typically include one or more airbags that work in conjunction with one another and with other safety systems to absorb or otherwise dissipate energy associated with an impact event away from occupants of the mobile platform. For example, airbags may be located within a steering wheel, an instrument panel, a roof rail, and/or seat assemblies of a vehicle. The various airbags work in conjunction with one another and with other vehicle-safety systems such as cross-car beams, seatbelts, and pre-tensioning devices to properly manage energy associated with an impact event and to improve occupant safety.

While the foregoing components work in conjunction with one another and are often sequenced to perform at different times during an impact event, the various components are separate and, as such, are typically positioned at different locations within the vehicle. Further, while the foregoing components adequately protect vehicle occupants, many of the safety systems cannot be easily incorporated into non-automotive applications. For example, frontal airbags typically disposed within a steering wheel and/or an instrument panel of a vehicle and side-curtain airbags typically disposed within a roof rail or pillar of a vehicle cannot readily be incorporated into an aircraft application or other mobile platforms that don't include similar structure. As a result, airbags and related safety systems are typically application-specific and, therefore, must be specifically designed for the particular mobile platform (i.e., automotive vehicle, train, bus, aircraft, etc.) and associated structure.

Recently, however, airbags have been incorporated into seat structures and related components that are common to mobile platforms in an effort to utilize a common airbag across various mobile platforms and to provide an airbag at each seating location. Namely, airbags have recently been incorporated into seatbacks of mobile platforms and/or have been mechanically attached to the webbing of seatbelts at an outer surface thereof to allow the airbag to be used in a variety of mobile platforms without requiring mounting of the airbag in the surrounding structure of the particular mobile platform. Mounting an airbag in a seatback or on a seatbelt obviates the need to support the airbag in a surrounding structure of a mobile platform such as a steering wheel, instrument panel, or bulkhead and, further, allows the airbag to be used across various mobile platforms and at each seating location of the mobile platforms without regard to the surrounding structure.

While conventional airbag assemblies may be attached to the webbing of a seatbelt, such assemblies require separate manufacturing of the airbag and seatbelt webbing. Further, attaching an airbag to a seatbelt likewise increases the overall cost and complexity associated with manufacturing the seatbelt and airbag module, as additional manufacturing steps are required to attach the airbag to the webbing of the seatbelt.

SUMMARY

This section provides a general summary of the disclosure, and is not a comprehensive disclosure of its full scope or all of its features.

A restraint system for a seat is provided and may include a first portion formed from a first material and having a first end fixed for movement with the seat and a second end movable relative to the seat. A second portion may be integral with or attached to the first portion, may be formed from the first material, and may be operable between a pre-deployed state and an inflated state.

In another configuration, a restraint system for a seat is provided and may include a seatbelt having a first segment, a second segment, and a latch mechanism that selectively couples the first segment to the second segment to restrain an occupant in the seat. The first segment or the second segment may be formed from an airbag-cushion material that includes a first portion attached at a first location to an anchor and at a second location to the latch mechanism and a second portion that is selectively movable from a pre-deployed state to an inflated state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the figures, a restraint device 10 is provided and may include a latch mechanism 12, a first segment 14, and a second segment 16. The latch mechanism 12 may be disposed between the first segment 14 and the second segment 16 and may be movable between an unlatched state permitting separation of the first segment 14 and the second segment 16 and a latched state joining the first segment 14 and second segment 16.

Figure 1:
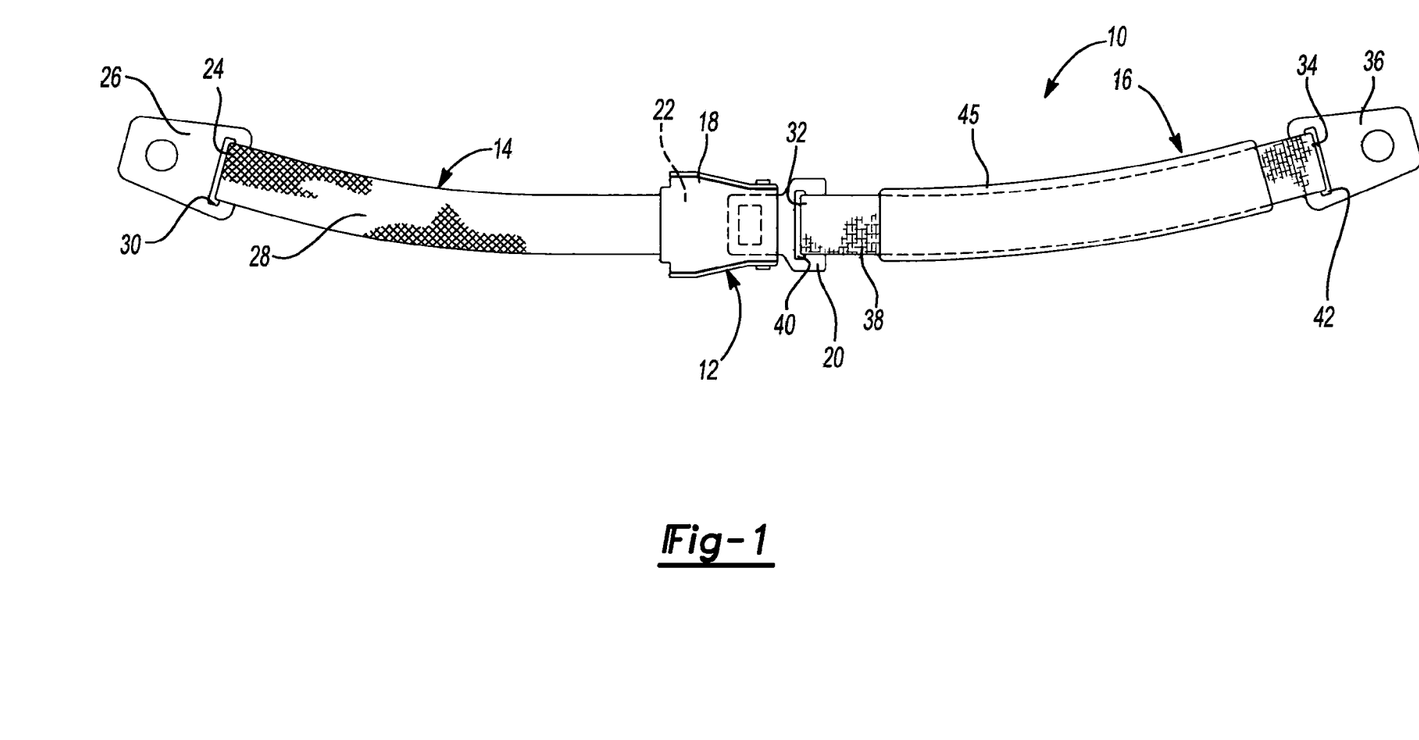
FIG. 1 is a perspective view of a restraint device in accordance with the principles of the present disclosure.

The latch mechanism 12 may include a buckle 18 and a tongue 20 that cooperate to selectively attach the first segment 14 and the second segment 16. Specifically, the buckle 18 may include an opening (not shown) that partially receives a portion of the tongue 20 to releasably couple the tongue 20 to the buckle 18 (FIG. 1). Coupling the tongue 20 to the buckle 18 likewise couples the first segment 14 to the second segment 16, as shown in FIG. 1. The first segment 14 and second segment 16 may be separated when a force is applied to the buckle 18 to disengage the tongue 20 from the buckle 18. The buckle 18 and tongue 20 could be any buckle and tongue that cooperate to selectively attach the first segment 14 and the second segment 16. For example, the buckle 18 and tongue 20 could be a buckle and tongue typically employed in an aircraft application, as shown in FIG. 1 or, alternatively, could be a buckle and tongue employed in an automotive application.

The first segment 14 may include a first end 22 that is attached to the buckle 18, a second end 24 that is attached to an anchor 26, and a main body 28 extending between the first end 22 and the second end 24. The first end 22 may be received within a portion of the buckle 18 and may be stitched or otherwise attached to itself following insertion of the first end 22 into the buckle 18 to attach the first end 22 of the first segment 14 to the buckle 18. Likewise, the second end 24 may pass through an opening 30 of the anchor 26 prior to being stitched or otherwise attached to itself to attach the second end 24 of the first segment 14 to the anchor 26. The main body 28 extends generally between the buckle 18 and the anchor 26 and may be formed from a woven material such as, for example, seatbelt webbing or airbag-cushion material.

The second segment 16 may include a first end 32, a second end 34, an anchor 36, and a main body 38 extending generally between the tongue 20 and the anchor 36. The first end 32 may be received in an opening 40 of the tongue 20 and may be stitched or otherwise attached to itself following insertion into the opening 40 to attach the first end 32 of the second segment 16 to the tongue 20. Likewise, the second end 34 may be inserted into an opening 42 of the anchor 36 and may subsequently be stitched or otherwise attached to itself following insertion of the second end 34 into the opening 42 to attach the second end 34 to the anchor 36.

The main body 38 may extend between the tongue 20 and the anchor 36 and may be formed from an airbag-cushion material. Specifically, the main body 38 may be formed from a cut-and-sewn airbag-cushion material, a one-piece woven (OPW) airbag-cushion material, or a laminate airbag-cushion material. Because the first end 32 and the second end 34 of the second segment 16 may be integrally formed with the main body 38, the first end 32 and the second end 34 may likewise be formed from an airbag-cushion material.

While the restraint device 10 will be described and shown hereinafter as including a second segment 16 associated with a tongue 20 and including a main body 38 being formed from an airbag-cushion material, the restraint device 10 could alternatively or additionally be constructed such that the first segment 14 includes a main body formed from an airbag-cushion material. Further, while the first segment 14 will be described and shown as including a main body 28 formed from seatbelt webbing, the first segment 14 could alternatively be configured such that the buckle 18 is disposed in close proximity to the anchor 26 and is rigidly attached to the anchor 26, as would commonly be found in an automotive application. For example, the anchor 26 could be rigidly attached to the buckle 18 via a bracket or Bowden cable in an automotive seat (not shown) where the buckle 18 is positioned in close proximity to a seat bottom (not shown) of the automotive seat. If the buckle 18 is positioned in close proximity to a seat bottom of a seat assembly, the main body 38 of the second segment 16 would be elongated to allow the main body 38 to extend over an occupant while concurrently allowing the tongue 20 to be selectively received by the buckle 18.

The main body 38 extends between the tongue 20 and the anchor 36 and may include a belt portion 44 and a cushion portion 46. The belt portion 44 and the cushion portion 46 may be formed from any of the above-described airbag-cushion materials and, further, may be formed from the same airbag-cushion material. In one configuration, the belt portion 44 and the cushion portion 46 include a unitary construction, whereby the belt portion 44 and the cushion portion 46 are formed from the same piece of airbag-cushion material.

The belt portion 44 may extend between the tongue 20 and the anchor 36 to permit forces applied to the main body 38 at the tongue 20 to be transmitted to the anchor 36 via the belt portion 44. Because the belt portion 44 serves to transmit forces from the tongue 20 to the anchor 36, the belt portion 44 must be formed from a sufficiently strong airbag-cushion material that is capable of transmitting forces from the tongue 20 to the anchor 36 without tearing. For example, the airbag-cushion material may be a so-called tight-matrix weave that provides sufficient strength to the main body 38 to allow the belt portion 44 to adequately transmit forces from the tongue 20 to the anchor 36 without tearing.

Figure 3:
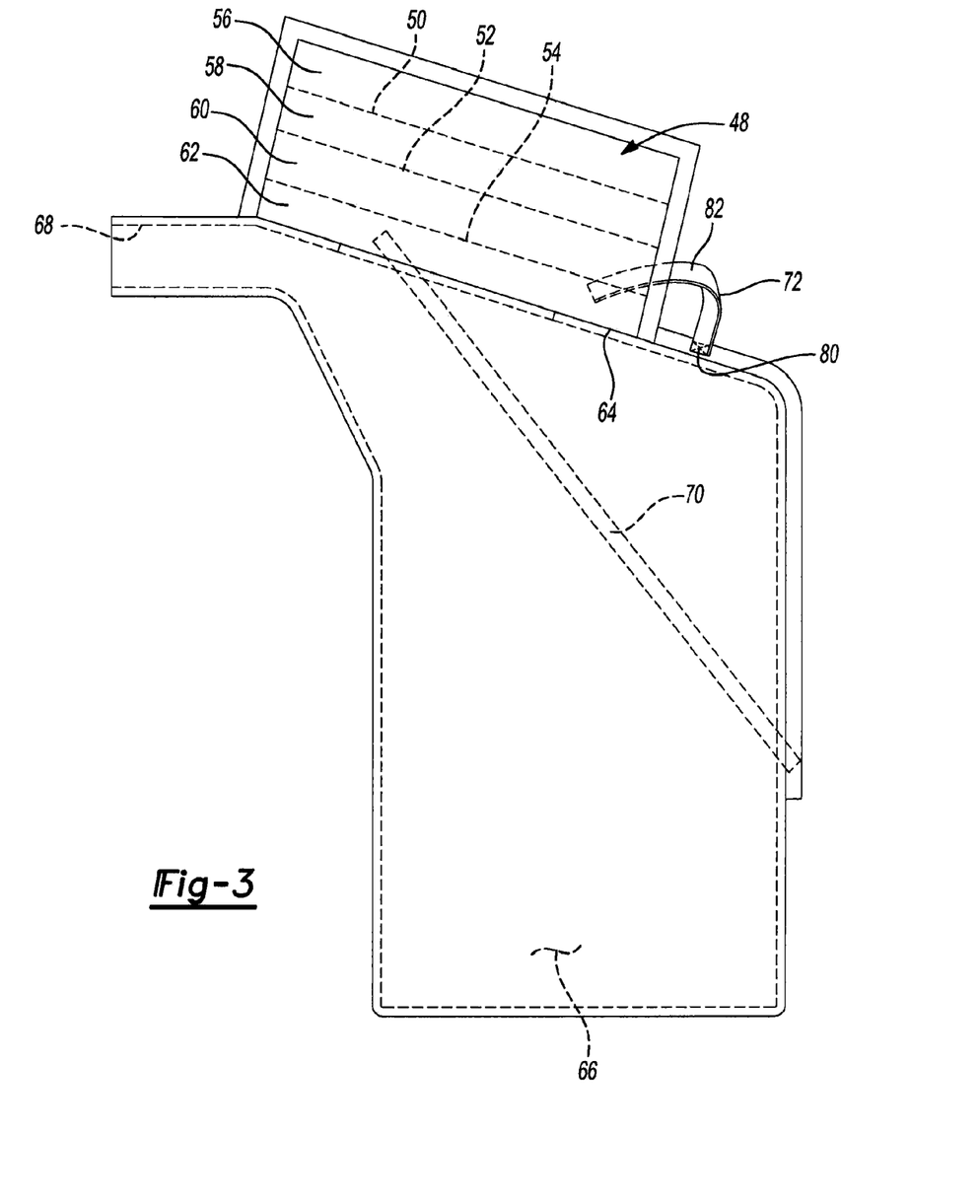
FIG. 3 is a perspective view of the restraint device of FIG. 1 shown in an unfolded state to illustrate the shape of a cushion portion and a belt portion of the restraint device.

The belt portion 44 may additionally or alternatively include a series of folds 48 (FIG. 3) that strengthen the main body 38 in the area of the belt portion 44 and increase the ability of the main body 38 to transmit loads from the tongue 20 to the anchor 36. The folds 48 work in conjunction with the particular material of the belt portion 44 to provide the belt portion 44 with a desired tensile strength, appearance, and shape along the length of the belt portion 44 and at each end 32, 34 of the second segment 16. For example, the belt portion 44 may be formed from an airbag-cushion material having a so-called tight-matrix weave that inherently has good tensile properties and is resistant to tearing. Such material may be used to form the belt portion 44 and may be provided with a series of folds 48, as shown in FIG. 3, to further increase the overall tensile strength of the belt portion 44 and allow the belt portion 44 to transmit higher loads from the tongue 20 to the anchor 36 without tearing.

In one configuration, the belt portion 44 may be formed by folding a portion of the main body 38 along fold lines 50, 52, 54 to form four (4) substantially equal segments 56, 58, 60, 62. The segments 56, 58, 60, 62 may be folded on one another in an accordion shape or, alternatively, segment 56 could be folded on top of segment 58; segment 58 could then be folded on segment 60; and segment 60 could then be folded on segment 62 such that the resulting structure includes segments 60 and 62 cooperating to form an outer surface of the belt portion 44. While the belt portion 44 is described and shown as including three folds 50, 52, 54 and four segments 56, 58, 60, 62, the belt portion 44 could include any number of folds and any number of segments. Further, the belt portion 44 could include virtually any shape that provides the belt portion 44 with a desired tensile strength, appearance, and shape.

After the folds 48 are formed to create the belt portion 44, the resulting belt portion 44 may provide the main body 38 with a substantially rectangular shape extending between the tongue 20 and the anchor 36. The folds 48 may be maintained by providing a series of stitches (none shown) at discrete locations between the tongue 20 and the anchor 36 and/or by providing a continuous stitch (not shown) extending between the tongue 20 and the anchor 36. Providing the stitches joins two or more of the segments 56, 58, 60, 62 and, therefore, maintains the desired shape of the belt portion 44.

Once the belt portion 44 is formed by folding the segments 56, 58, 60, 62 about lines 50, 52, 54, the first end 32 of the second segment 16 may be attached to the tongue 20 at the opening 40 while the second end 34 of the second segment 16 may be attached to the anchor 36 at the opening 42. As described above, the material of the second segment 16 may be stitched to itself after the first and second ends 32, 34 are respectively received through the openings 40, 42 in an effort to attach the first end 32 to the tongue 20 and to attach the second end 34 to the anchor 36.

Figure 2:
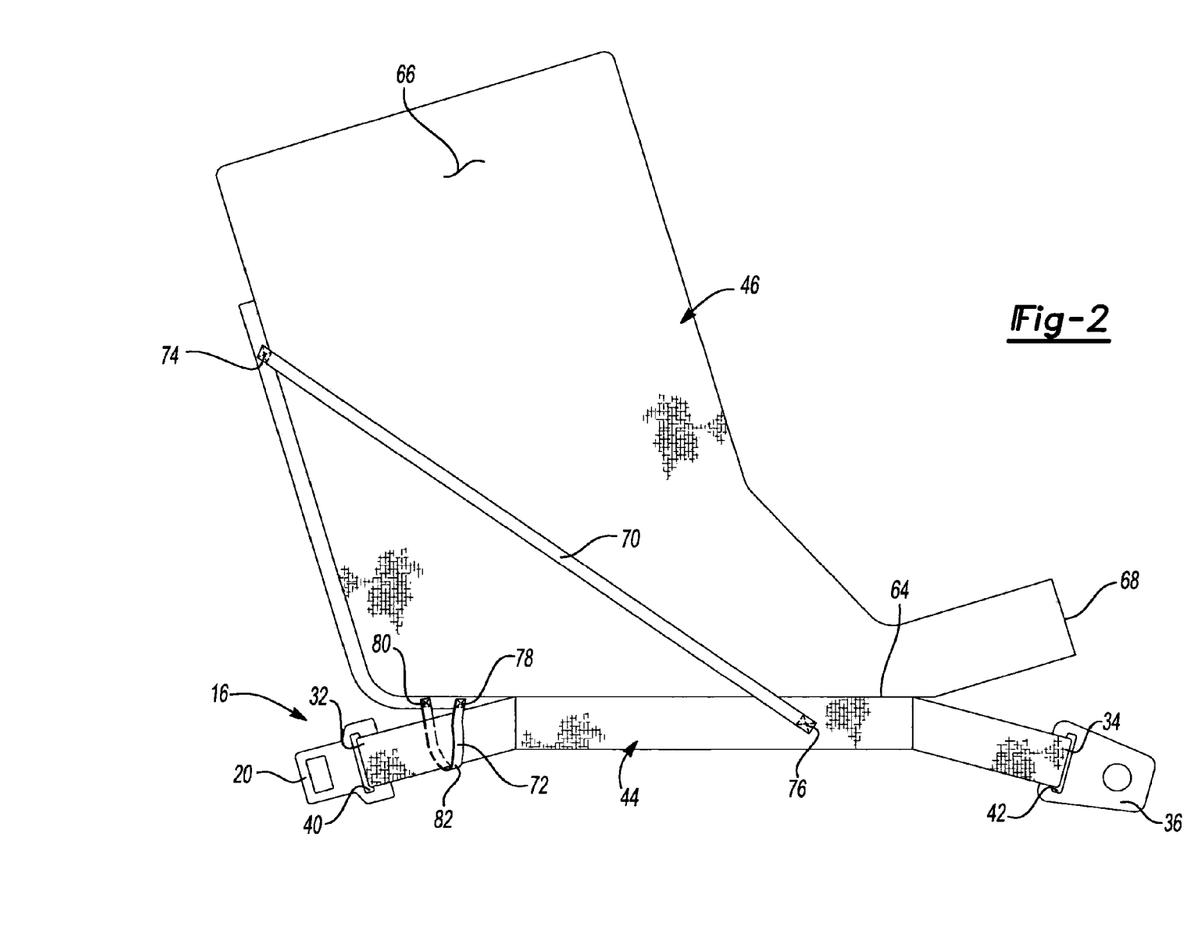
FIG. 2 is a perspective view of the restraint device of FIG. 1 in a deployed but un-inflated state to illustrate the shape and configuration of a cushion portion of the restraint device.

The cushion portion 46 may be formed from the same material as the belt portion 44 and, further, may be integrally formed with the belt portion 44 such that the cushion portion 46 is formed from the same piece of airbag-cushion material. The cushion portion 46 may extend from the belt portion 44 at a junction 64 (FIGS. 2 and 3) of the belt portion 44 and the cushion portion 46. The junction 64 may fluidly isolate the belt portion 44 from the cushion portion 46 or, alternatively, may permit fluid communication between the belt portion 44 and the cushion portion 46. Should the junction 64 provide fluid communication between the belt portion 44 and the cushion portion 46, a portion of the belt portion 44 may be inflated when the cushion portion 46 is inflated, as will be described in greater detail below.

While the cushion portion 46 is described as being formed from the same material as the belt portion 44, the cushion portion 46 and the belt portion 44 may include different weave patterns and, further, may be formed from different material types to provide the respective portions 44, 46 with different strength and/or elongation properties. Specifically, the belt portion 44 and the cushion portion 46 are described as being part of the main body 38 and, thus, as being formed from a cut-and-sewn airbag-cushion material, an OPW airbag-cushion material, or a laminate airbag-cushion material. As such, the belt portion 44 and the cushion portion 46 may both be formed from the same type of material (i.e., a cut-and-sewn airbag-cushion material, OPW airbag-cushion material, or a laminate airbag-cushion material) or, alternatively, may be formed from different types of material. For example, the belt portion 44 could be formed from an OPW airbag-cushion material while the cushion portion 46 is formed from a laminate airbag-cushion material. The particular weave of each portion 44, 46 and the type of material chosen for each portion 44, 46 may be tailored to provide each portion 44, 46 with a desired strength and/or elongation property. As such, any combination of material type and weave may be selected including forming each portion 44, 46 from a material having an identical weave pattern and material type.

The cushion portion 46 may extend from the belt portion 44 at the junction 64 and may include a contact surface 66 and an opening 68. The contact surface 66 may be positioned relative to the belt portion 44 such that when the cushion portion 46 is inflated, the contact surface 66 opposes an occupant (FIGS. 7-10). The opening 68 may be disposed proximate to the junction 64 of the belt portion 44 and the cushion portion 46 and is in fluid communication with an interior of the cushion portion 46 to selectively supply the cushion portion 46 with pressurized gas.

The cushion portion 46 may additionally include break stitching (now shown) and/or may be folded to promote inflation of the cushion portion 46 in a direction away from the belt portion 44 prior to the cushion portion 46 moving in a lateral direction (i.e., in a direction substantially parallel to a longitudinal axis of the belt portion 44). The break stitching may be disposed within the interior of the cushion portion 46 and may be designed to break at a threshold pressure to allow the cushion portion 46 to first inflate in a direction substantially perpendicular to a longitudinal axis of the belt portion 44 prior to moving laterally and in a direction substantially parallel to the longitudinal axis of the belt portion 44.

The cushion portion 46 may additionally or alternatively include an external tether 70 and/or a loop tether 72. The external tether 70 may be formed from the same material as the belt portion 44 and cushion portion 46 or, alternatively, may be formed from a different material. Regardless of the particular construction of the external tether 70, the external tether 70 may extend at least partially across the contact surface 66 and may include a first end 74 attached to the cushion portion 46 and a second end 76 attached to the belt portion 44. One of the first end 74 and the second end 76 may be integrally formed with the belt portion 44 or cushion portion 46 to obviate the need to attach the tether 70 to the belt portion 44 or cushion portion 46. The external tether 70 may guide and direct movement of the cushion portion 46, as the cushion portion 46 is inflated. Specifically, the external tether 70 may restrict lateral movement of the cushion portion 46 in a direction substantially parallel to a longitudinal axis of the belt portion 44 and may properly position the contact surface 66 of the cushion portion 46 upon full inflation of the cushion portion 46.

The loop tether 72 may include a first end 78 and a second end 80 that are both attached to the cushion portion 46. As with the external tether 70, the loop tether 72 may be constructed such that one of the first end 78 or the second end 80 is integrally formed with the cushion portion 46 to obviate the need to attach both ends 78, 80 to the cushion portion 46. The loop tether 72 may additionally include a main body 82 that extends generally between the first end 78 and the second end 80 and surrounds the belt portion 44. While the loop tether 72 is described as including a first end 78 and a second end 80 that are attached to the cushion portion 46, one of the first end 78 or the second end 80 could alternatively be attached to the belt portion 44. If one of the first end 78 and the second end 80 are attached to the belt portion 44, one of the first end 78 or the second end 80 could be integrally formed with the belt portion 44 or, alternatively, could be integrally formed with the cushion portion 46.

Regardless of the particular construction of the loop tether 72, if one of the first end 78 or the second end 80 is attached to the belt portion 44, the loop tether 72 acts in a similar fashion as the external tether 70 to control the trajectory of the cushion portion 46 upon inflation. Likewise, if the first end 78 and the second end 80 of the loop tether 72 are attached to the cushion portion 46 with the main body 82 surrounding an outer perimeter of a portion of the belt portion 44, the loop tether 72 likewise may control a trajectory of the cushion portion 46 upon inflation. However, should the loop tether 72 include the first end 78 and the second end 80 attached to the cushion portion 46, the loop tether 72 may move along the belt portion 44 in a direction substantially parallel to a longitudinal axis of the belt portion 44 and may be sized to allow the loop tether 72 to pass over the buckle 18 and tongue 20 such that the loop tether 72 surrounds the first segment 14 of the restraint device 10 upon full inflation of the cushion portion 46. In any event, the loop tether 72 may aide in controlling the trajectory of the cushion portion 46 and may properly position the contact surface 66 of the cushion portion 46 upon inflation of the cushion portion 46.

The cushion portion 46 may include any or all of the break stitching, the external tether 70, and the loop tether 72. The cushion portion 46 may therefore utilize any or all of the break stitching, external tether 70, and loop tether 72 to control movement of the cushion portion 46 during and following inflation of the cushion portion 46 in an effort to properly position the contact surface 66 of the cushion portion 46.

The cushion portion 46 may be folded and collapsed onto the belt portion 44 when the cushion portion 46 is in a pre-deployed state. Specifically, the cushion portion 46 may be folded in an accordion shape, for example, such that the cushion portion 46 includes a substantially rectangular profile. The folded cushion portion 46 may then be position adjacent to the belt portion 44 and may remain in close proximity to the belt portion 44 until the cushion portion 46 is inflated. While the cushion portion 46 is described as being folded in an accordion shape having a substantially rectangular profile, the cushion portion 46 could be folded in any manner and may include virtually any profile that permits the cushion portion 46 to properly move from the pre-deployed state to an inflated state within a desired time frame and allow the cushion portion 46 to mimic the shape of the belt portion 44 when in the pre-deployed state.

Once the cushion portion 46 is folded and is properly positioned relative to the belt portion 44, a cover 45 (FIG. 1) may surround an outer perimeter of the belt portion 44 and the cushion portion 46. The cover 45 may surround the belt portion 44 and the cushion portion 46 to retain a desired fold pattern of the cushion portion 46 and to maintain the cushion portion 46 in close proximity to the belt portion 44 until the cushion portion 46 is inflated. The cover 45 may include a tear seam (not shown) that provides a localized region of weakness to allow the cushion portion 46 to initially move in a desired direction upon inflation of the cushion portion 46. In one configuration, the tear seam of the cover portion may be positioned to direct the cushion portion 46 in a direction substantially perpendicular to a longitudinal axis of the belt portion 44 to encourage inflation of the cushion portion 46 in a direction generally away from the belt portion 44. Further, the cushion portion 46 may be stitched to the belt portion 44 via break stitches (none shown) that break upon inflation of the cushion portion 46. Such break stitches may be used in place of or in conjunction with the cover 45 to retain the relative position of the belt portion 44 and cushion portion 46 when the cushion portion 46 is in the pre-deployed state.

The cushion portion 46 may be moved from the pre-deployed state to the inflated state by introducing pressurized gas into the interior of the cushion portion 46 at the opening 68. Specifically, the cushion portion 46 may include a gas-delivery system 85 that selectively provides the cushion portion 46 with pressurized gas to move the cushion portion 46 from the pre-deployed state to the inflated state. The gas-delivery system 85 may include an inflator 86 fluidly coupled to the opening 68 of the cushion portion 46 by a gas guide 87. The gas guide 87 may be formed from a relatively rigid material and may be secured to the cushion portion 46 at the opening 68 by a clamp 89. The clamp 89 may encircle the cushion portion 46 at the opening 68 and may compress the cushion portion 46 at the opening 68 to prevent inadvertent removal of the gas guide 87 from the cushion portion 46.

Figure 4:
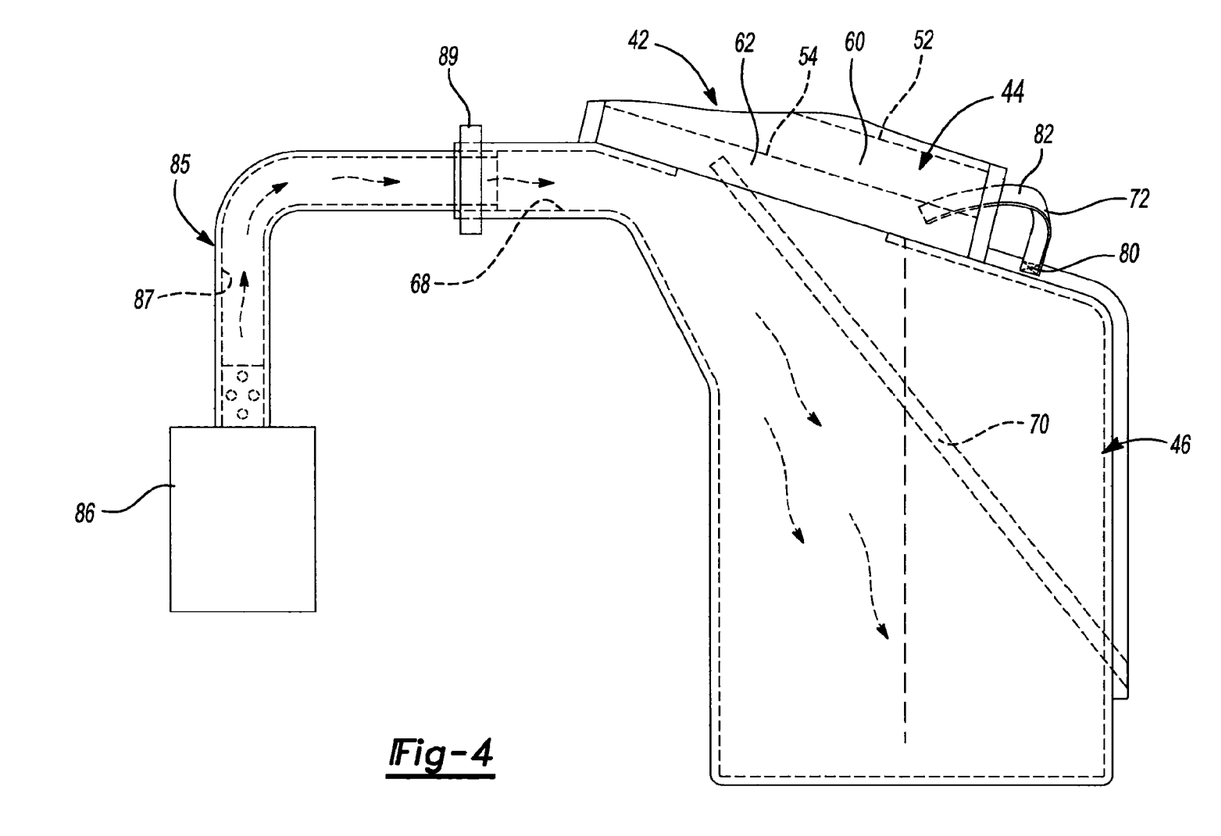
FIG. 4 is a perspective view of the restraint device of FIG. 1 shown in an unfolded state to illustrate a gas-delivery system of the restraint device.
Figure 5:
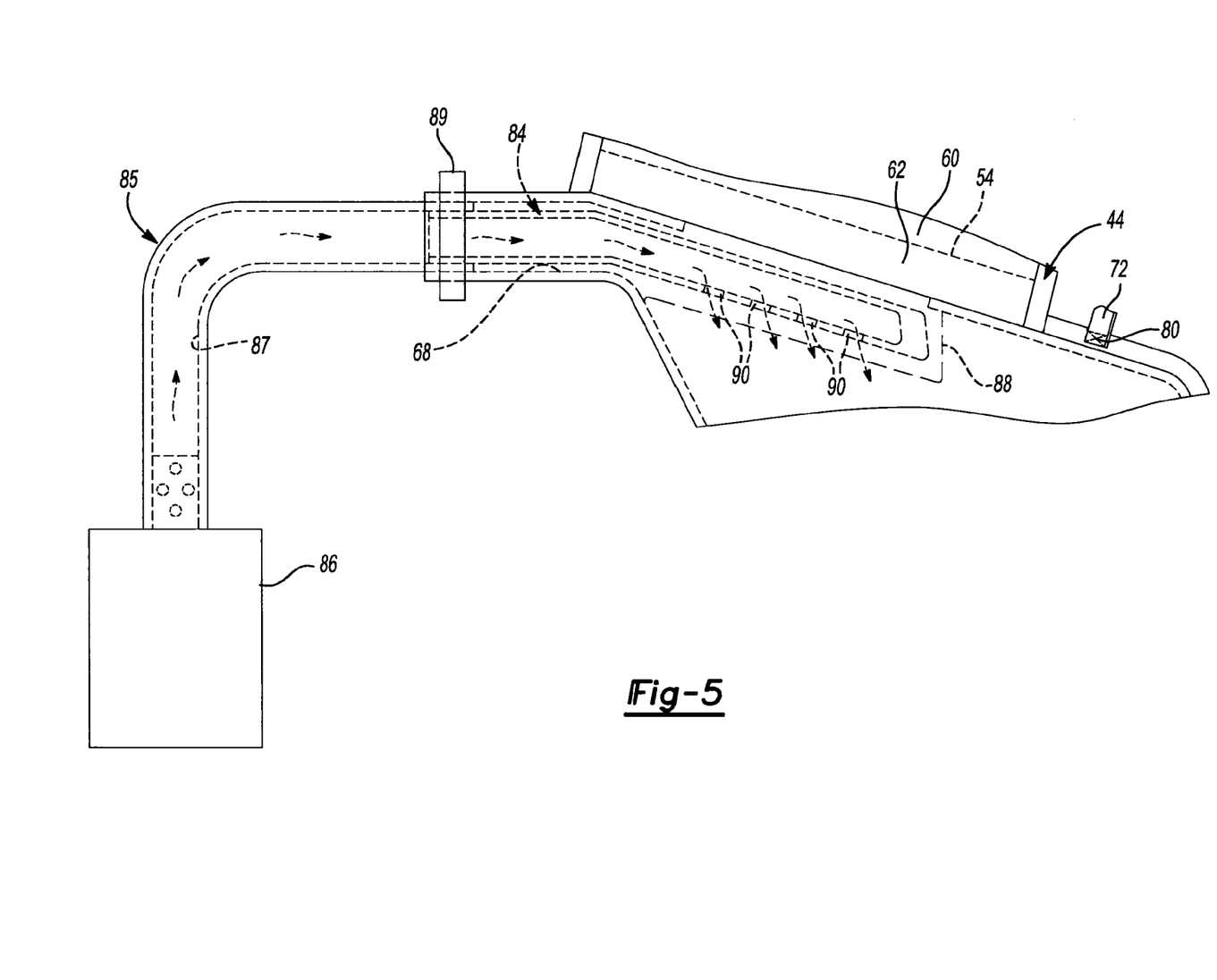
FIG. 5 is a partial perspective view of the restraint device of FIG. 1 shown in an unfolded state to illustrate a gas-delivery system of the restraint device used in combination with a manifold.

The gas guide 87 may be in direct fluid communication with an interior of the cushion portion 46 at the opening 68 to directly provide the cushion portion 46 with pressurized gas generated by the inflator 86 (FIG. 4). Alternatively, the gas guide 87 may be fluidly coupled to a manifold 84 that is inserted into the cushion portion 46 at the opening 68 (FIG. 5). The manifold 84 may be received within a pocket 88 formed in the cushion portion 46, as shown in FIG. 5. Alternatively, the manifold 84 may be directly inserted into the interior of the cushion portion 46 without being received by a pocket 88 of the cushion portion 46.

The pocket 88 may cooperate with the opening 68 to properly position the manifold 84 relative to the cushion portion 46 and, further, to retain the manifold 84 within the cushion portion 46. The manifold 84 may be formed from a flexible material to permit the manifold 84 to move when the second segment 16 is moved relative to an external structure such as, for example, the inflator 86, and may include a series of openings 90 that are in fluid communication with the interior of the cushion portion 46. The pocket 88 may likewise include a series of passageways (not shown) that are in fluid communication with the interior of the cushion portion 46. The passageways may be in fluid communication with an interior of the cushion portion 46 prior to inflation of the cushion portion 46 or, alternatively, may include break stitching (none shown) that ruptures once the manifold 84 introduces pressurized gas into the pocket 88 via the openings 90.

Figure 6:
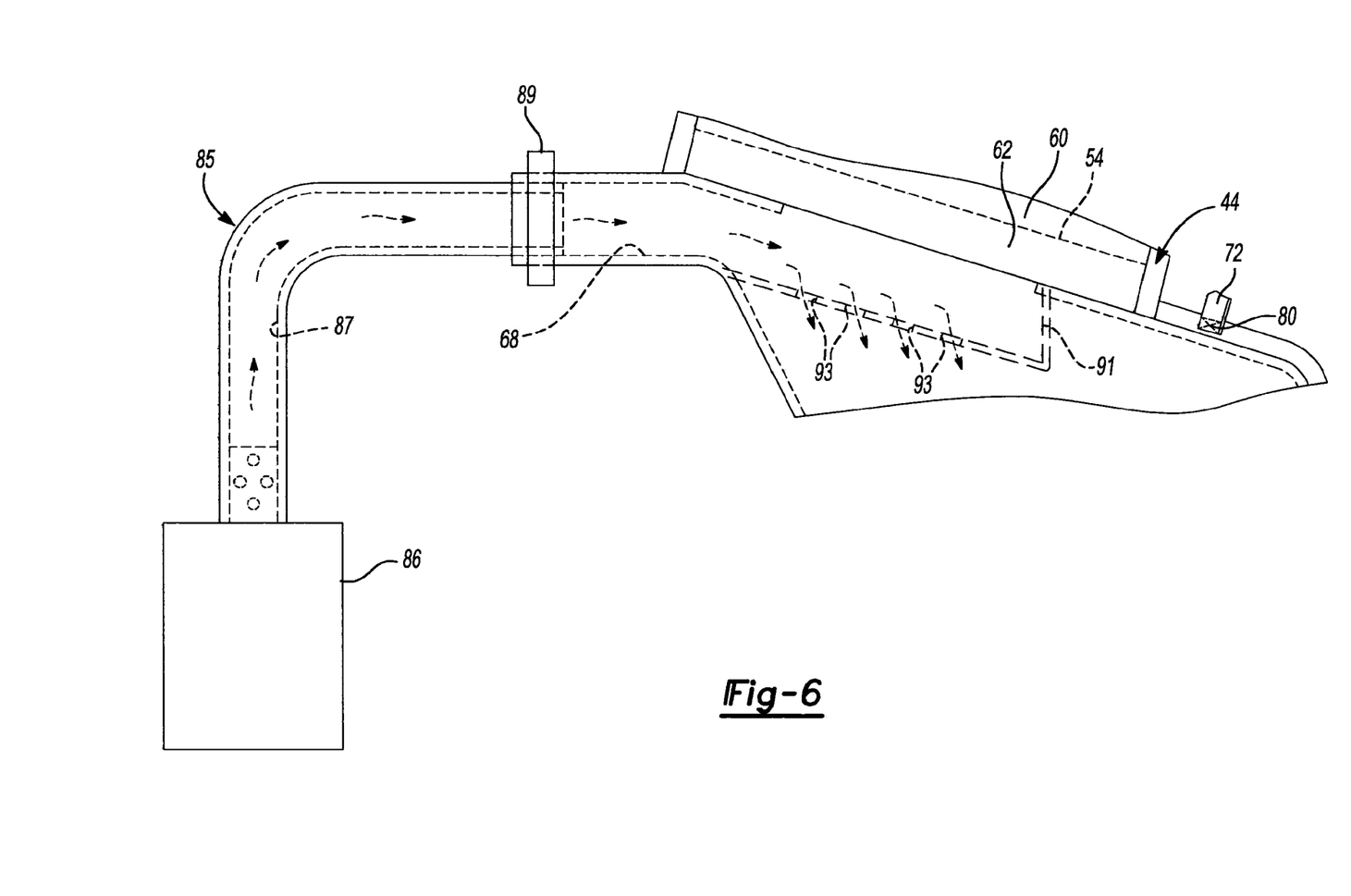
FIG. 6 is a partial perspective view of the restraint device of FIG. 1 shown in an unfolded state to illustrate a gas-delivery system of the restraint device used in combination with a pocket of a cushion portion of the restraint device.
Figure 7:
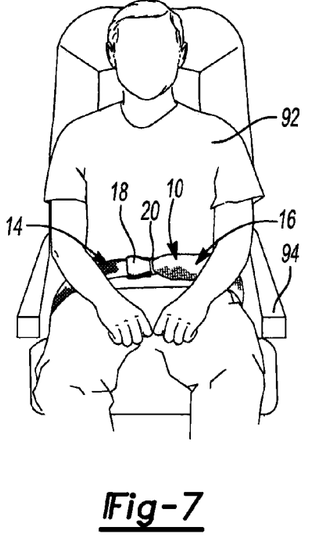
FIG. 7 is a perspective view of an occupant seated in a seat assembly incorporating the restraint device of FIG. 1 in a pre-deployed state.

While the gas-delivery system 85 may be in communication with a manifold 84 disposed within the cushion portion 46 with or without the pocket 88, the gas-delivery system 85 may alternatively be in direct communication with a pocket 91 sewn into or integrally formed with the cushion portion 46 to deliver pressurized gas to the interior of the cushion portion 46. As with the manifold 84, the pocket 91 may include apertures 93 that deliver pressurized gas to the interior of the cushion portion 46 to move the cushion portion 46 from the pre-deployed state to the inflated state. Alternatively, the pocket 91 may include break stitching (not shown) that ruptures when the pressurized gas from the inflator 86 enters the pocket 91 to allow the pressurized gas to exit the pocket 91 and inflate the cushion portion 46.

With particular reference to FIGS. 7-12, operation of the restraint device 10 will be described in detail. The restraint device 10 may be moved from an unlatched state (not shown) to a latched state (FIG. 7) by inserting the tongue 20 into the buckle 18. Insertion of the tongue 20 into the buckle 18 attaches the first segment 14 and the second segment 16, thereby retaining an occupant 92 within a seat assembly 94. In one configuration, the anchor 26 of the first segment 14 is attached to the seat assembly 94 while the anchor 36 of the second segment 16 is likewise attached to the seat assembly 94. Therefore, inserting the tongue 20 into the buckle 18 and attaching the first segment 14 to the second segment 16 retains the occupant 92 within the seat assembly 94, as the first segment 14 and second segment 16 span a waist area of the occupant 94. While the anchors 26, 36 are described as being attached to the seat assembly 94, the anchors 26, 36 could alternatively be attached to any structure that fixes the anchors 26, 36 for movement with the seat assembly 94. For example, the anchors 26, 36 could be attached to a structure such as a vehicle floor pan or pillar (neither shown).

The seat assembly 94 may be incorporated into a mobile platform (not shown) such as an automotive vehicle, an airplane, a train, or a bus. Should the mobile platform experience an impact event, a signal may be sent to the restraint device 10, thereby causing the inflator 86 to generate pressurized gas. The pressurized gas may flow from the inflator 86 into the manifold 84, thereby pressurizing the manifold 84. Once the pressure within the manifold 84 reaches a predetermined threshold pressure, the pressurized gas exits the manifold 84 at the openings 90 and, thereafter, enters the cushion portion 46 via the passageways formed in the pocket 88 of the cushion portion 46.

Figure 8:
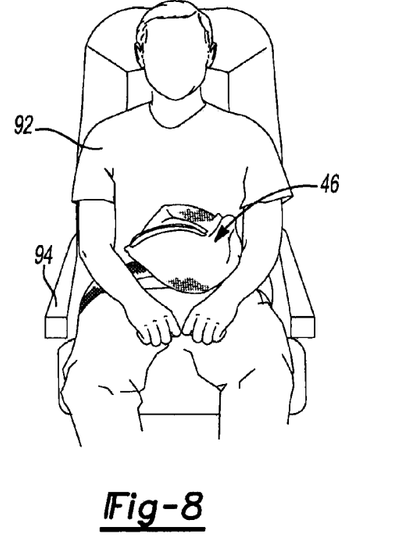
FIG. 8 is a perspective view of an occupant seated in a seat assembly incorporating the restraint device of FIG. 1 in a partially-deployed state.
Figure 9:
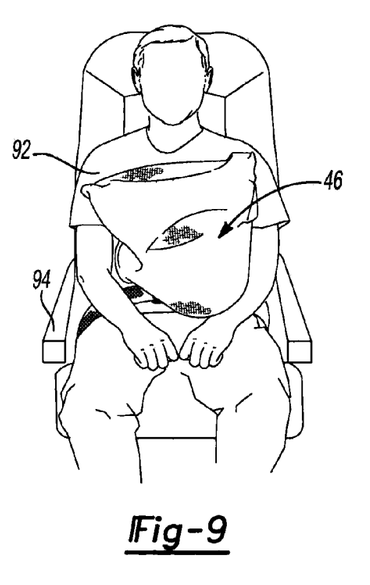
FIG. 9 is a perspective view of an occupant seated in a seat assembly incorporating the restraint device of FIG. 1 in a partially-deployed state.
Figure 10:
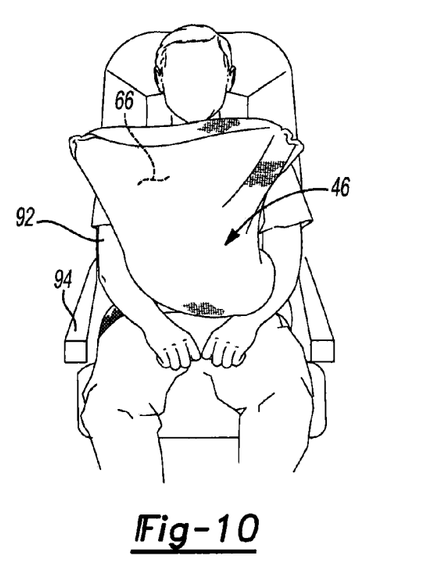
FIG. 10 is a perspective view of an occupant seated in a seat assembly incorporating the restraint device of FIG. 1 in a fully-deployed state.
Figure 11:
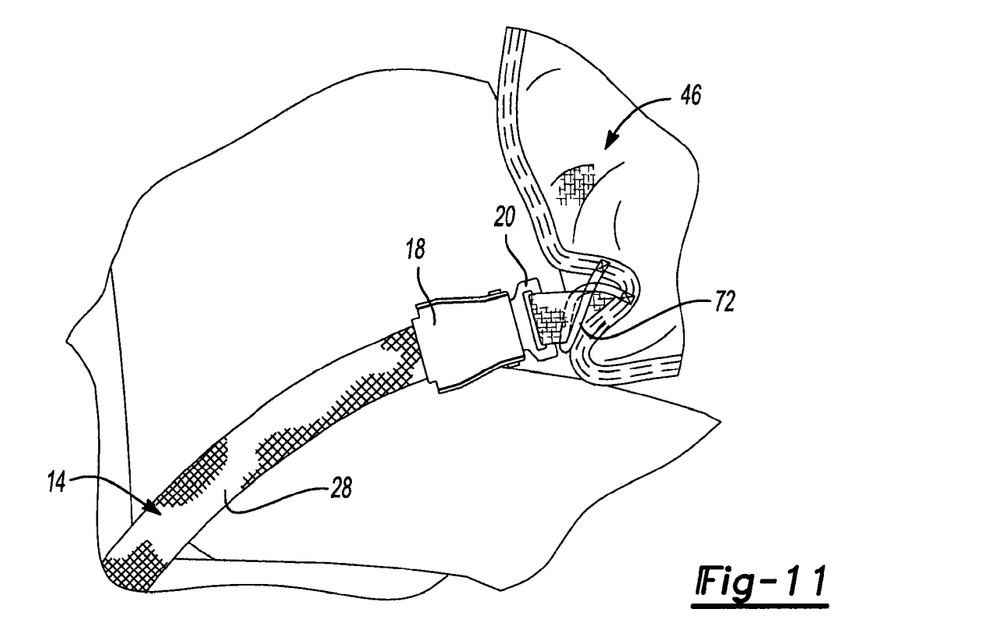
FIG. 11 is a partial perspective view of the restraint device of FIG. 1 incorporated into a seat assembly and in a partially-deployed state.
Figure 12:
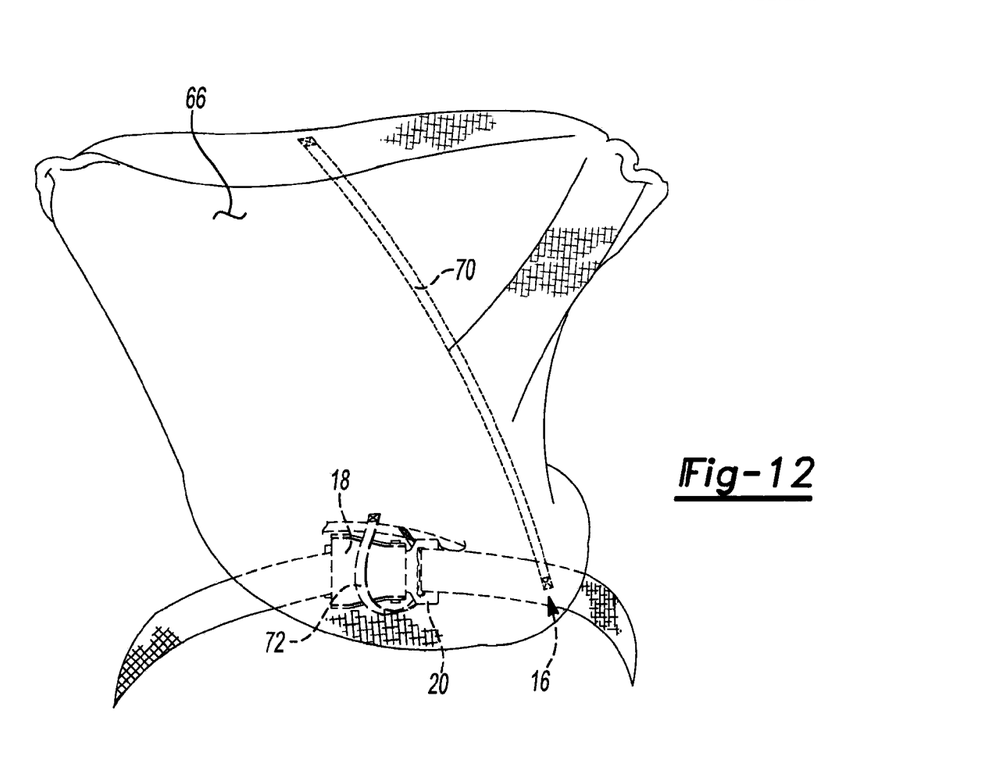
FIG. 12 is a perspective view of the restraint device of FIG. 1 in a fully-deployed state.

The internal break stitching of the cushion portion 46, in conjunction with the external tether 70 and/or loop tether 72, cause the cushion portion 46 to first inflate in a direction generally away from the belt portion 44. Specifically, the break stitching, external tether 70, and/or loop tether 72 cause the cushion portion 46 to initially extend in a direction substantially perpendicular to a longitudinal axis of the belt portion 44 such that the cushion portion 46 initially extends toward a head of the occupant 92. Once the cushion portion 46 is sufficiently inflated in a direction toward the head of the occupant 92, the break stitching disposed within the cushion portion 46 may rupture, thereby allowing the cushion portion 46 to inflate laterally across a torso of the occupant 92 and in a direction substantially parallel to the longitudinal axis of the belt portion 44. The external tether 70 and/or loop tether 72 may likewise permit and encourage such lateral movement of the cushion portion 46 to allow the cushion portion 46 to not only inflate toward the head of the occupant 92 but also move across the torso of the occupant 92 (FIGS. 8 and 9). Once the cushion portion 46 is fully inflated, the contact surface 66 of the cushion portion 46 opposes the head and torso of the occupant 92, thereby allowing the occupant 92 to contact the cushion portion 46 in an optimal location to allow the cushion portion 46 to absorb energy associated with movement of the occupant 92 relative to the seat assembly 94.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A restraint system for a seat, the restraint system comprising:
    a first portion formed from a first material and including a first end fixed for movement with the seat and a second end attached to one of a buckle and a tongue and movable relative to the seat, said first portion including at least three segments extending along an entire length of said first portion between said first end and said second end formed by folding said first material along at least two fold lines that extend substantially parallel to a longitudinal axis of said first portion; and
    a second portion attached to one of said at least three segments of said first portion and formed from said first material, said second portion operable between a pre-deployed state and an inflated state.

2. The restraint system of claim 1, wherein said first portion and said second portion are integrally formed from a same piece of said first material.

3. The restraint system of claim 2, wherein said first portion and said second portion include different weave patterns.

4. The restraint system of claim 1, wherein said first material is one of a cut-and-sewn airbag-cushion material, a one-piece woven airbag-cushion material, or a laminate airbag-cushion material.

5. The restraint system of claim 1, wherein said first end is attached to an anchor to fix said first end for movement with the seat and said one of said buckle and said tongue is in selective engagement with an other of said buckle and said tongue.

6. The restraint system of claim 5, wherein said other of said buckle and said tongue is attached to the seat by seatbelt webbing or airbag-cushion material.

7. The restraint system of claim 1, wherein said first material remains folded when said second portion is in said inflated state.

8. The restraint system of claim 1, further comprising a manifold in fluid communication with said second portion and operable to selectively deliver pressurized gas to said second portion to move said second portion from said pre-deployed state to said inflated state.

9. The restraint system of claim 8, wherein said manifold is flexible to permit movement of said first portion and said second portion relative to the seat when said second portion is in said pre-deployed state.

10. The restraint system of claim 8, wherein said manifold is received within a pocket of said second portion, said pocket including at least one passageway that communicates said pressurized gas from said manifold to an interior of said second portion to move said second portion from said pre-deployed state to said inflated state.

11. The restraint system of claim 10, wherein said at least one passageway is closed prior to movement of said second portion into said inflated state.

12. The restraint system of claim 8, wherein said first portion is in fluid communication with said manifold.

13. The restraint system of claim 1, further comprising at least one tether associated with said second portion that controls a trajectory of said second portion when said second portion is moved from said pre-deployed state to said inflated state.

14. The restraint system of claim 13, wherein said at least one tether is integrally formed with one of the first portion or the second portion.

15. In a restraint system for a seat, a seatbelt includes a first belt segment, a second belt segment, and a latch mechanism that selectively couples said first belt segment to said second belt segment to restrain an occupant in the seat, said first belt segment or said second belt segment being formed from an airbag-cushion material that includes a first portion attached at a first location to an anchor and at a second location to said latch mechanism and a second portion selectively movable from a pre-deployed state to an inflated state, said first portion including at least three segments extending along an entire length of said first portion between said first location and said second location and formed by folding said airbag-cushion material along at least two fold lines that extend substantially parallel to a longitudinal axis of said first portion.

16. The seatbelt of claim 15, wherein said first portion and said second portion are integrally formed from a same piece of said airbag-cushion material.

17. The seatbelt of claim 15, wherein said airbag-cushion material is one of a cut-and-sewn material, a one-piece woven material, or a laminate material.

18. The seatbelt of claim 15, wherein said first portion and said second portion are formed from different airbag-cushion materials.

19. The seatbelt of claim 18, wherein said first portion and said second portion include different weave patterns.

20. The seatbelt of claim 15, wherein said first portion and said second portion include different weave patterns.

21. The seatbelt of claim 15, wherein said airbag-cushion material remains folded when said second portion is in said inflated state.

22. The seatbelt of claim 15, wherein said latch mechanism includes a buckle associated with one of said first belt segment and said second belt segment and a tongue associated with an other of said first belt segment and said second belt segment.

23. The seatbelt of claim 22, wherein said first portion is attached to said tongue.

24. The seatbelt of claim 15, further comprising a manifold in fluid communication with said second portion and operable to selectively deliver pressurized gas to said second portion to move said second portion from said pre-deployed state to said inflated state.

25. The seatbelt of claim 24, wherein said manifold is flexible to permit movement of said first portion and said second portion relative to the seat when said second portion is in said pre-deployed state.

26. The seatbelt of claim 24, wherein said manifold is received within a pocket of said second portion, said pocket including at least one passageway that communicates said pressurized gas from said manifold to an interior of said second portion to move said second portion from said pre-deployed state to said inflated state.

27. The seatbelt of claim 26, wherein said at least one passageway is closed prior to movement of said second portion into said inflated state.

28. The seatbelt of claim 24, wherein said first portion is in fluid communication with said manifold.

29. The seatbelt of claim 15, further comprising at least one tether associated with said second portion that controls a trajectory of said second portion when said second portion is moved from said pre-deployed state to said inflated state.

* * * * *